(12) United States Patent
Yamamoto et al.

(10) Patent No.: US 10,760,471 B2
(45) Date of Patent: Sep. 1, 2020

(54) AUXILIARY MACHINE-DRIVING DEVICE FOR VEHICLE

(71) Applicant: Nissan Motor Co., Ltd., Yokohama-shi, Kanagawa (JP)

(72) Inventors: Takeshi Yamamoto, Kanagawa (JP); Shin Hashimoto, Kanagawa (JP); Kenshi Ushijima, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 403 days.

(21) Appl. No.: 15/577,374

(22) PCT Filed: Jun. 22, 2015

(86) PCT No.: PCT/JP2015/067819
§ 371 (c)(1),
(2) Date: Nov. 28, 2017

(87) PCT Pub. No.: WO2016/207935
PCT Pub. Date: Dec. 29, 2016

(65) Prior Publication Data
US 2018/0171859 A1    Jun. 21, 2018

(51) Int. Cl.
*F01P 5/12* (2006.01)
*F16H 37/06* (2006.01)
(Continued)

(52) U.S. Cl.
CPC ............... *F01P 5/12* (2013.01); *F02B 39/06* (2013.01); *F02B 67/04* (2013.01); *F16H 15/02* (2013.01);
(Continued)

(58) Field of Classification Search
CPC ....... F01P 5/12; F01P 2005/125; F16H 15/02; F16H 15/40; F16H 37/06; F02B 39/06; F02B 67/04; B60K 2025/022
See application file for complete search history.

(56) References Cited

U.S. PATENT DOCUMENTS 4,476,424 A * 10/1984 Kalman .................... H02P 5/74
                                                          318/737
5,931,759 A * 8/1999 Otaki ......................... B62M 6/40
                                                          475/183
(Continued)

FOREIGN PATENT DOCUMENTS

JP    2002-31202 A    1/2002
JP    2003-246273 A   9/2003
(Continued)

*Primary Examiner* — Joseph J Dallo
(74) *Attorney, Agent, or Firm* — Global IP Counselors, LLP

(57) ABSTRACT

An auxiliary machine-driving device is provided for a vehicle. The auxiliary machine-driving device has a first roller, a second roller, a third roller, a fourth roller and a fifth roller. The first roller rotates integrally with a rotary shaft of an engine. The second roller rotates integrally with a rotary shaft of a motor/generator. The third roller rotates integrally with a rotary shaft of an auxiliary machine. The fourth roller is provided between the first roller and the second roller. The fifth roller that always contacts the second roller and the third roller. The actuator switches the fourth roller between a contact state with the first and second rollers and a separation state from the first and second rollers.

8 Claims, 9 Drawing Sheets

(51) Int. Cl.
*F16H 15/02* (2006.01)
*F02B 39/06* (2006.01)
*F02B 67/04* (2006.01)
*F16H 15/40* (2006.01)
*B60K 25/02* (2006.01)

(52) U.S. Cl.
CPC ............ *F16H 15/40* (2013.01); *F16H 37/06* (2013.01); *B60K 2025/022* (2013.01); *F01P 2005/125* (2013.01)

(56) References Cited

U.S. PATENT DOCUMENTS

| | | | |
|---|---|---|---|
| 8,057,353 B2 * | 11/2011 | Yamamoto | F16H 15/46 476/59 |
| 9,212,605 B2 | 12/2015 | Hashimoto et al. | |
| 10,036,312 B2 * | 7/2018 | Hashimoto | B60W 10/08 |
| 2006/0019786 A1 * | 1/2006 | Asa | F01C 17/02 475/5 |
| 2006/0054374 A1 * | 3/2006 | Wimmer | F02B 67/04 180/248 |
| 2008/0293529 A1 * | 11/2008 | Di Giacomo | F16H 7/02 474/148 |
| 2009/0013952 A1 * | 1/2009 | Deniston | B60K 6/485 123/179.28 |
| 2015/0211414 A1 * | 7/2015 | Hashimoto | B60K 6/48 74/661 |

FOREIGN PATENT DOCUMENTS

| | | |
|---|---|---|
| JP | 2007-16729 A | 1/2007 |
| JP | 2008-531946 A | 8/2008 |
| WO | 2014/038554 A1 | 3/2014 |

* cited by examiner

AUXILIARY MACHINE-DRIVING DEVICE FOR VEHICLE

CROSS-REFERENCE TO RELATED APPLICATIONS

This application is a U.S. National stage application of International Application No. PCT/JP2015/067819, filed Jun. 22, 2015.

BACKGROUND

Field of the Invention

The present invention relates to an auxiliary machine-driving device for a vehicle.

Background Information

As the type of technique therefor, the technique described in Japanese Laid-Open Patent Application No. 2008-531946 (Patent Document 1) below has been disclosed. The document discloses a technique in which, by moving the position of a single friction wheel with a single actuator, switching between connecting/disconnecting the transmission of torque from the crankshaft to the accessory is enabled.

SUMMARY

With the technique in the above-cited Patent Document 1, the drive source that drives the accessory could not be switched. In view of the problem described above, an object of the present invention is to provide an auxiliary machine-driving device for a vehicle in which the drive source that drives the auxiliary machine can be switched by changing the position of a single idler roller.

An auxiliary machine-driving device for a vehicle is provided with a fourth roller disposed between a first roller that rotates integrally with the rotary shaft of the engine and a second roller that rotates integrally with the rotary shaft of a motor generator; a fifth roller that is always in contact with the second roller and a third roller that rotates integrally with the rotary shaft of an accessory that is driven by the engine or the motor generator; and an actuator for switching the fourth roller between a state of contact with and a state of separation from the first and second rollers.

Therefore, in the present invention, the drive source that drives the auxiliary machine can be switched by changing the position of a single idler roller.

BRIEF DESCRIPTION OF THE DRAWINGS

Referring now to the drawings, an auxiliary machine-driving device for a vehicle is illustrated.

DETAILED DESCRIPTION OF THE DETAILED DESCRIPTION OF THE EMBODIMENTS

Embodiments according to the present invention will be described below, with reference to the appended drawings. In the explanations of the drawings, the same elements are given the same reference symbols, and overlapping explanations are omitted.

First Embodiment

Figure 1:
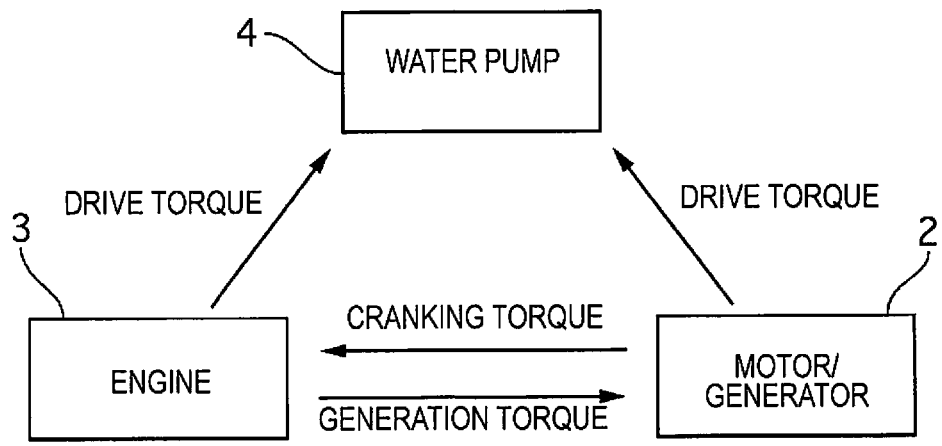
FIG. 1 is a schematic system block diagram of the auxiliary machine-driving device for a vehicle of the first embodiment.
Figure 2:
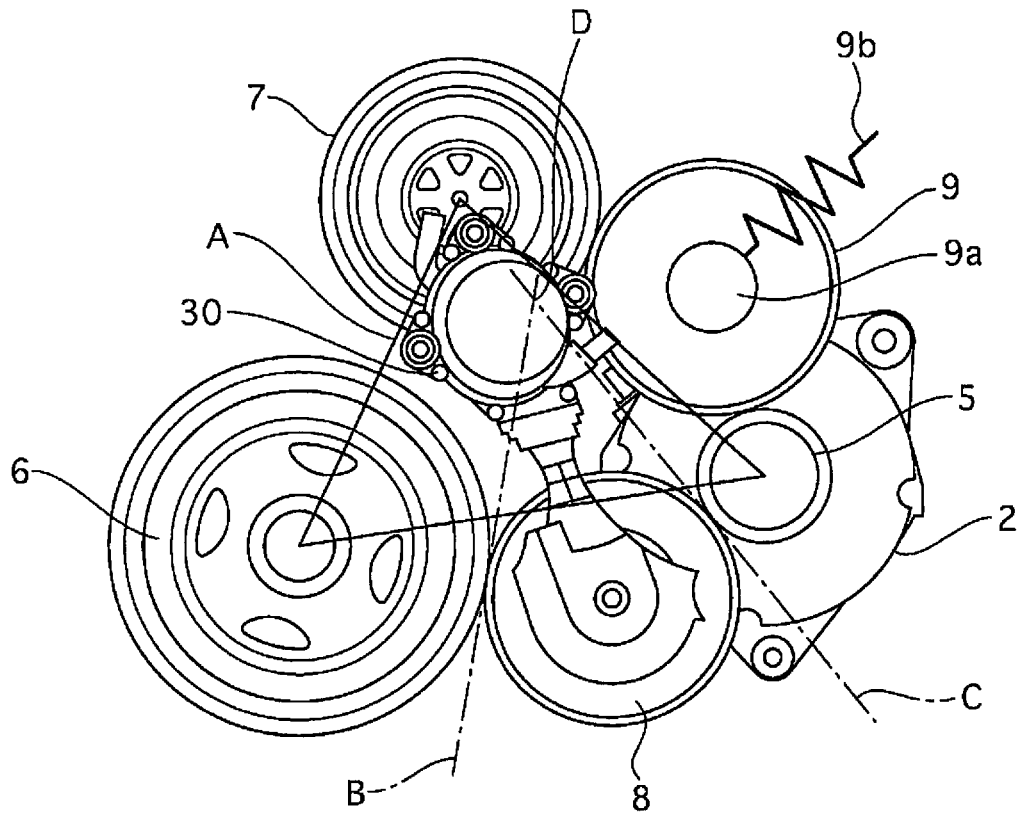
FIG. 2 is a schematic diagram illustrating the auxiliary machine-driving device for a vehicle of the first embodiment.

An auxiliary machine-driving device 1 for a vehicle of the first embodiment will now be described. FIG. 1 is a schematic system block diagram of the auxiliary machine-driving device for a vehicle of the first embodiment. FIG. 2 is a schematic diagram illustrating the auxiliary machine-driving device for a vehicle of the first embodiment.

The auxiliary machine-driving device 1 for a vehicle transmits a cranking torque from a motor/generator 2 to an engine 3 at the time of an engine start. The engine 3 is started by the cranking torque. The auxiliary machine-driving device 1 for a vehicle transmits a power generation torque from the engine 3 to the motor/generator 2 after an engine start. The motor/generator 2 generates power with the power generation torque and provides electrical power to batteries and electrical equipment.

The auxiliary machine-driving device 1 for a vehicle transmits a drive torque from the engine 3 to the water pump 4 after an engine start. The water pump 4 is driven by the drive torque and cooling water is provided from the water pump 4 to the engine 3. The engine 3 is cooled with the supplied cooling water. In addition, air is warmed using the cooling water that is warmed by the heat of the engine 3 to enable the use of the heater of the air conditioner.

The auxiliary machine-driving device 1 for a vehicle transmits a drive torque from the motor/generator 2 to the water pump 4 when the engine is stopped. The water pump 4 is driven by the drive torque and cooling water is provided from the water pump 4 to the engine 3. Air is warmed using the cooling water that is warmed by the heat of the engine 3 to enable the use of the heater of the air conditioner even when the engine is stopped.

The auxiliary machine-driving device 1 for a vehicle carries out the transmission of torque using a friction drive that makes use of a wedge effect. The auxiliary machine-driving device 1 for a vehicle comprises a motor/generator roller 5 that rotates integrally with a drive shaft of the motor/generator 2, an engine roller 6 that rotates integrally with a crank shaft of the engine 3, and a water pump roller 7 that rotates integrally with a drive shaft of the water pump 4.

The motor/generator roller 5, the engine roller 6 and the water pump roller 7 are arranged so that the order will be the engine roller 6, the water pump roller 7 and the motor/generator roller 5 in the direction of rotation (clockwise direction in FIG. 2) of the engine roller 6. The motor/generator 2 rotates in the clockwise direction in FIG. 2 both during driving and during power generation.

Between the motor/generator roller 5 and the engine roller 6, a first idler roller 8 is provided. The first idler roller 8 is supported at the actuator 30 so as to be able to rotate freely. The actuator 30 switches the three states of the state, that is, the state in which the first idler roller 8 is separated from the motor/generator roller 5 and the engine roller 6, the state in which the first idler roller 8 is in contact with the motor/generator roller 5 and the engine roller 6, and the state in which the first idler roller 8 is pressed against the motor/generator roller 5 and the engine roller 6. The actuator 30 is electric, but the drive source merely needs to use a motor, solenoid, etc., and is not particularly limited.

Between the water pump roller 7 and the motor/generator roller 5, a second idler roller 9 that comes into contact with the outer peripheral surfaces of the two is provided. The second idler roller 9 is supported at a rotational center part via a bearing 9a so as to be able to turn freely. The second idler roller 9 is biased in the direction in which the idler roller comes into contact with the outer peripheral surfaces of the water pump roller 7 and the motor/generator roller 5 by a biasing member 9b.

The biasing force of the second idler roller 9, caused by the biasing member 9b, against the motor/generator roller 5 and the water pump roller 7 is sufficient if the second idler roller 9 is not separated from the motor/generator roller 5 and the water pump roller 7.

The first idler roller 8 and the second idler roller 9 are provided so that the rotational centers of the first idler roller 8 and the second idler roller 9 are positioned outside of a triangle A that is formed by connecting the rotational centers of the motor/generator roller 5, the engine roller 6 and the water pump roller 7.

In addition, the first idler roller 8 is provided so that, in a state of contact with the motor/generator roller 5 and the engine roller 6, the direction of rotation of the motor/generator roller 5 at the point of contact between the first idler roller 8 and the motor/generator roller 5 is the direction towards a point of intersection D between a line B tangent at the point of contact between the first idler roller 8 and the engine roller 6 and a line C tangent at the point of contact between the first idler roller 8 and the motor/generator roller 5.

The outer peripheral surfaces of the motor/generator roller 5, the engine roller 6 and the water pump roller 7 are formed from an iron-based metal. The outer peripheral surfaces of the first idler roller 8 and the second idler roller 9 are formed from a resin.

The hardness of the resin that is used to form the outer peripheral surfaces of the first idler roller 8 and the second idler roller 9 is less than the hardness of the iron-based metal that forms the outer peripheral surfaces of the motor/generator roller 5, the engine roller 6 and the water pump roller 7.

The strength of the resin that is used to form the outer peripheral surfaces of the first idler roller 8 and the second idler roller 9 is less than the strength of the iron-based metal that forms the outer peripheral surfaces of the motor/generator roller 5, the engine roller 6 and the water pump roller 7.

The material that is used as the resin to form the outer peripheral surfaces of the first idler roller 8 and the second idler roller 9 is such that the coefficients of dynamic friction between the outer peripheral surfaces of the motor/generator roller 5, the engine roller 6 and the water pump roller 7 and the outer peripheral surfaces of the first idler roller 8 and the second idler roller 9 are 0.3 or greater.

Wedge Effect

In the auxiliary machine-driving device 1 for a vehicle of the first embodiment, the transmission of torque between two rollers is carried out by a force acting in the direction in which an idler roller bites in between the two rollers in contact with the idler roller, thereby generating a wedge effect. The positional relationship among the rollers in order that a wedge effect is generated in the idler roller will be described below.

Figure 3:
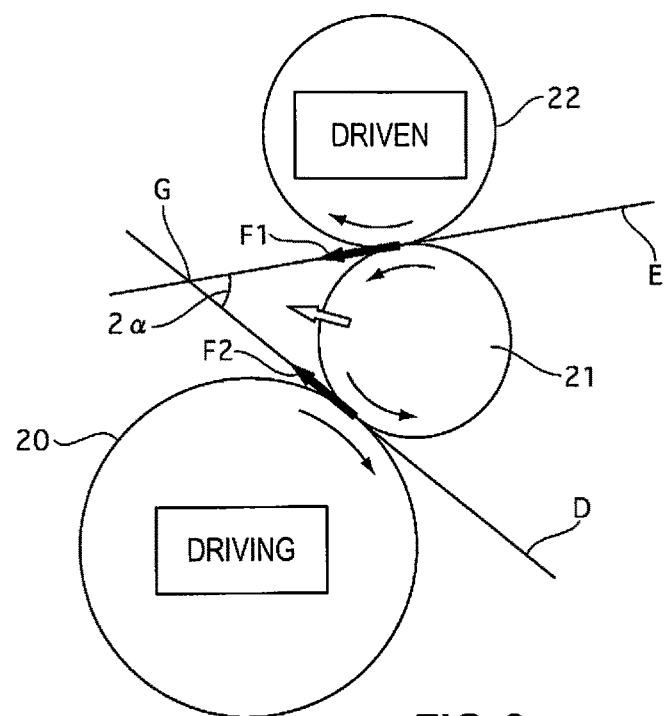
FIG. 3 is a schematic diagram of the auxiliary machine-driving device for a vehicle of the first embodiment.

FIG. 3 is a schematic diagram of the auxiliary machine-driving device 1 for a vehicle of the first embodiment. In FIG. 3, the second roller 22 is the driving roller and the first roller 20 is the driven roller. When the positional relationship among the first roller 20, the second roller 22, and the idler roller 21 that is in contact with the two is as illustrated in FIG. 3, a wedge effect is generated in the idler roller 21.

The tangent line D of the first roller 20 and the idler roller 21, and the tangent line E of the idler roller 21 and the second roller 22 intersect at point G. The size of the angle formed by the tangent line D and the tangent line E is $2\alpha$.

The torque of the second roller 22 is transmitted to the idler roller 21. In FIG. 3, when the second roller 22 rotates clockwise, the idler roller 21 in contact with the second roller 22 rotates counterclockwise. At this time, the idler roller 21 is pushed in the same direction as the direction of rotation of the second roller 22 at the point of contact with the second roller 22. In other words, a force in the same direction as the direction of rotation of the second roller 22 acts on the idler roller 21 at the point of contact with the second roller 22 (force F1).

The torque of the idler roller 21 is transmitted to the first roller 20. In FIG. 3, when the idler roller 21 rotates counterclockwise, the first roller 20 in contact with the idler roller 21 rotates clockwise. At this time, the first roller 20 is pushed in the direction of rotation of the idler roller 21 at the point of contact with the idler roller 21. In other words, a reaction force in the direction opposite to the direction in which the first roller 20 is pushed acts on the idler roller 21 at the point of contact with the first roller 20 (force F2).

The magnitudes of the force F1 and the force F2 are approximately equal. A force in the direction towards point G acts on the idler roller 21 because of the resultant force of the force F1 and the force F2. The contact load of the idler roller 21 against the first roller 20 and the second roller 22 is increased, and torque can be transmitted from the second roller 22 to the first roller 20 via the idler roller 21.

The greater the load of the first roller 20 (the greater the torque transmitted from the second roller 22 to the first roller 20), the greater the force in the direction towards point G that acts on the idler roller 21. The friction force F between the first roller 20 and the idler roller 21, or the friction force between the idler roller 21 and the second roller 22, can be obtained by the following formula.

$$F = \tau \times A$$

Here, τ is the shear stress between the first roller 20 and the idler roller 21, or the shear stress between the idler roller 21 and the second roller 22. A is the contact area of the first roller 20 and the idler roller 21, or the contact area of the idler roller 21 and the second roller 22.

The shear stress τ is determined by the materials of the contact surface of the first roller 20 and the idler roller 21 and the materials of the contact surface of the second roller 22 and the idler roller 21. The contact area A has a high correlation with the contact load of the idler roller 21 against the first roller 20 and the second roller 22 when the aforementioned resin is used for the outer peripheral surface of the idler roller 21, and the greater the contact load, the greater the contact area A.

Figure 4:
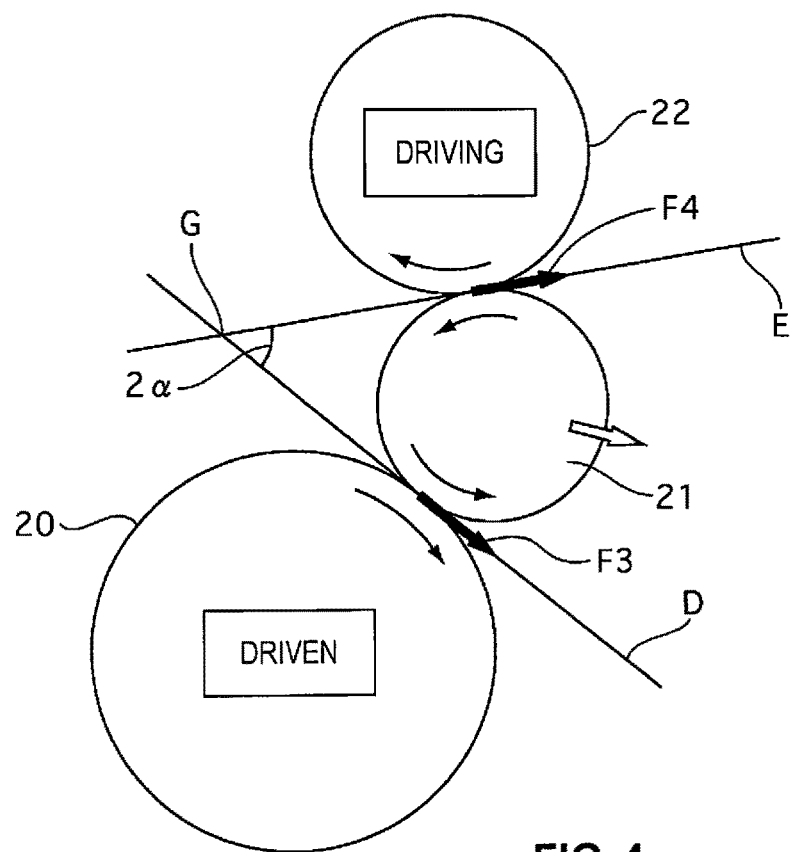
FIG. 4 is a schematic diagram of the auxiliary machine-driving device for a vehicle of the first embodiment.

FIG. 4 is a schematic diagram of the auxiliary machine-driving device 1 for a vehicle of the first embodiment. In FIG. 4, the first roller 20 is the driving roller and the second roller 22 is the driven roller. When the positional relationship among the first roller 20, the second roller 22, and the idler roller 21 that is in contact with the two is as illustrated in FIG. 4, a wedge effect is not generated in the idler roller 21.

The torque of the first roller 20 is transmitted to the idler roller 21. In FIG. 4, when the first roller 20 rotates clockwise, the idler roller 21 in contact with the first roller 20 rotates counterclockwise. At this time, the idler roller 21 is pushed in the same direction as the direction of rotation of the first roller 20 at the point of contact with the first roller 20. In other words, a force in the same direction as the direction of rotation of the first roller 20 acts on the idler roller 21 at the point of contact with the first roller 20 (force F3).

The torque of the idler roller 21 is transmitted to the second roller 22. In FIG. 4, when the idler roller 21 rotates counterclockwise, the second roller 22 in contact with the idler roller 21 rotates clockwise. At this time, the second roller 22 is pushed in the direction of rotation of the idler roller 21 at the point of contact with the idler roller 21. In other words, a reaction force in the direction opposite to the direction in which the second roller 22 is pushed acts on the idler roller 21 at the point of contact with the second roller 22 (force F4).

The magnitudes of the force F3 and the force F4 are approximately equal. A force in the direction away from point D acts on the idler roller 21 due to the resultant force of the force F3 and the force F4. The contact load of the idler roller 21 against the first roller 20 and the second roller 22 decreases. Thus, the transmission of torque from the first roller 20 to the idler roller 21 and transmission of torque from the idler roller 21 to the second roller 22 are hardly carried out.

In order to generate a wedge effect as described above, the positional relationship among the first roller 20, the idler roller 21 and the second roller 22 must be configured in the following manner.

The direction of rotation of the second roller 22 at the point of contact between the second roller 22 and the idler roller 21 must be in the direction towards point of intersection G (the point of intersection of line D, tangent at the point of contact between the first roller 20 and the idler roller 21, and line E, tangent at the point of contact between the second roller 22 and the idler roller 21).

In addition, the positional relationship among the first roller 20, the idler roller 21 and the second roller 22 must satisfy the following formula.

$$\mu > \tan \alpha$$

Here, μ is the coefficient of dynamic friction between the first roller 20 and the idler roller 21, or the coefficient of dynamic friction between the idler roller 21 and the second roller 22.

Behavior of the Auxiliary Machine-Driving Device

Figure 5:
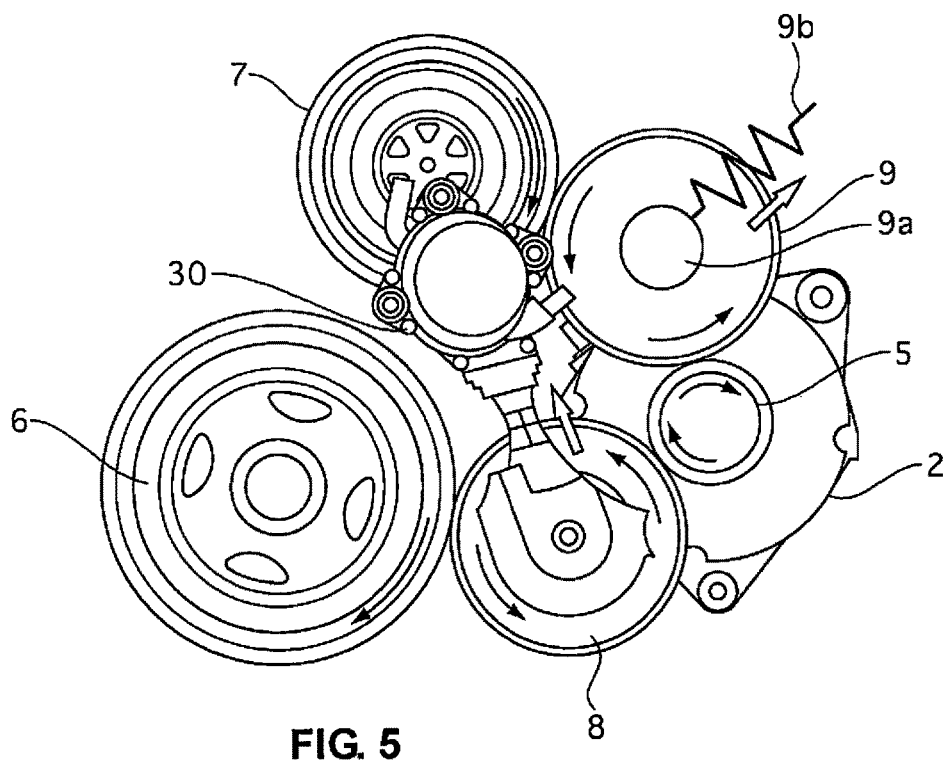
FIG. 5 is a view illustrating the movements of the members of the auxiliary machine-driving device for a vehicle of the first embodiment.

FIG. 5 is a view illustrating the movements of the members of the auxiliary machine-driving device 1 for a vehicle at the time of an engine start. When the engine starts, cranking of the engine 3 is carried out by the drive torque of the motor/generator 2.

At the time of an engine start, the first idler roller 8 is made to come into contact with the motor/generator roller 5 and the engine roller 6 by the actuator 30.

The motor/generator 2 is driven, and the motor/generator roller 5 is rotated clockwise in FIG. 5. The first idler roller 8 is rotated counterclockwise by the motor/generator roller 5, and the engine roller 6 is rotated clockwise by the first idler roller 8. At this time, a wedge effect acts on the first idler roller 8, and a force acts in the direction in which the idler roller bites in between the motor/generator roller 5 and the engine roller 6. As a result, the drive torque of the motor/generator 2 is transmitted to the engine 3 via the first idler roller 8.

The second idler roller 9 is rotated counterclockwise by the motor/generator roller 5, and the water pump roller 7 is rotated clockwise by the second idler roller 9. At this time, a force acts on the second idler roller 9 in the direction away from the motor/generator roller 5 and the water pump roller 7, and a wedge effect is not generated. However, since the load of the water pump 4 is not large, the water pump 4 can be sufficiently driven by the pressing force of the biasing member 9b, even if a wedge effect does not occur. The water pump 4 is driven and cooling water is provided to the engine 3.

Figure 6:
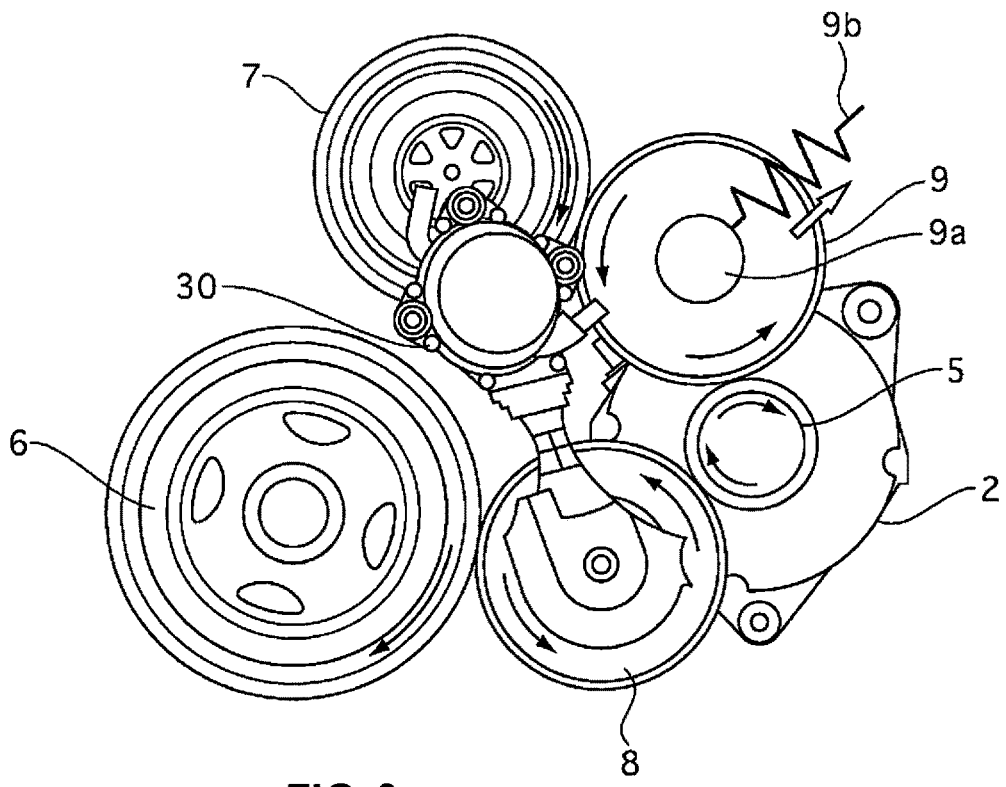
FIG. 6 is a view illustrating the movements of the members of the auxiliary machine-driving device for a vehicle of the first embodiment.

FIG. 6 is a view illustrating the movements of the members of the auxiliary machine-driving device 1 for a vehicle after engine start (during driving). During engine drive, the motor/generator 2 generates power with the torque of the engine 3.

During engine drive, the first idler roller 8 is pressed against the motor/generator roller 5 and the engine roller 6 by the actuator 30. In FIG. 6, during engine drive, engine roller 6 is rotated clockwise by the driving force of the engine 3. The first idler roller 8 is rotated counterclockwise by the engine roller 6, and the motor/generator roller 5 is rotated clockwise by the first idler roller 8. At this time, a force acts on the first idler roller 8 in the direction away from the motor/generator roller 5 and the water pump roller 7, and a wedge effect is not generated. However, since the first idler roller 8 is pressed against the motor/generator roller 5 and the water pump roller 7 by the actuator 30, the torque of the engine 3 is transmitted to the motor/generator 2 via the first idler roller 8.

Since the motor/generator roller 5 is rotated clockwise by the torque of the engine 3, in the same manner as at the time of engine start, the water pump 4 is driven. Cooling water is provided from the water pump 4 to the engine 3.

Figure 7:
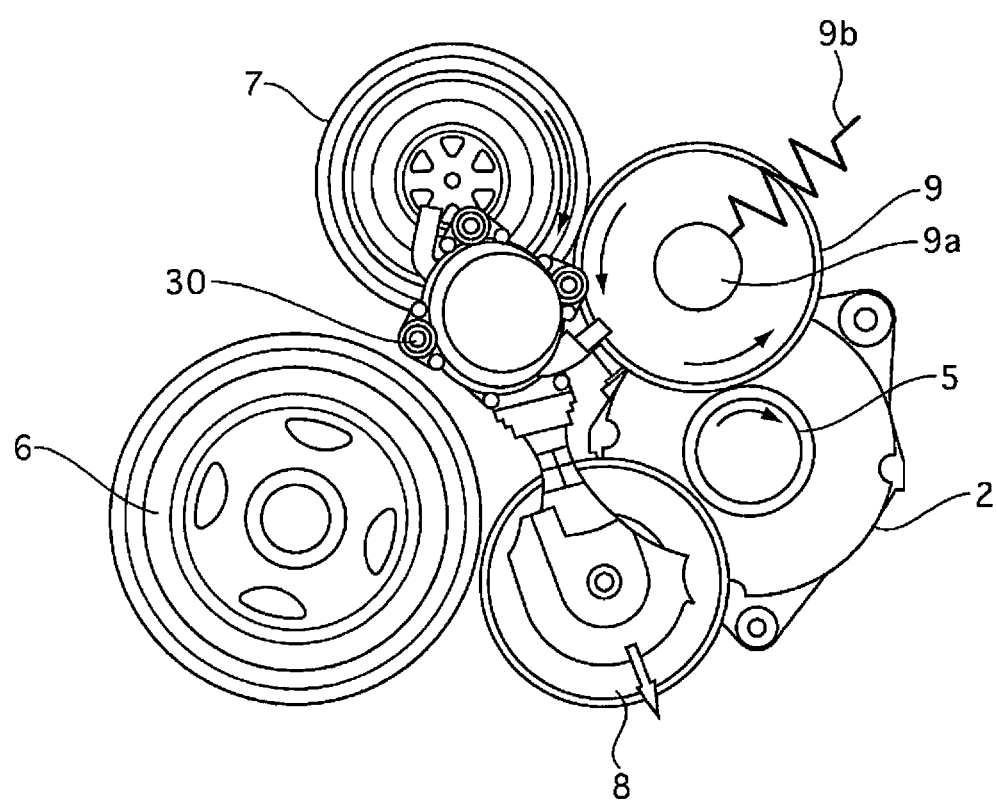
FIG. 7 is a view illustrating the movements of the members of the auxiliary machine-driving device for a vehicle of the first embodiment.

FIG. 7 is a view illustrating the movements of the members of the auxiliary machine-driving device 1 for a vehicle when the engine is stopped. When the engine is stopped, the water pump 4 is driven by the motor/generator 2.

During idle stop control, the first idler roller 8 is separated from the motor/generator roller 5 and the engine roller 6 by the actuator 30. The motor/generator 2 is driven, and the motor/generator roller 5 is rotated clockwise in FIG. 7. Since the motor/generator roller 5 is rotated clockwise, in the same manner as at the time of engine start, the water pump 4 is driven. Cooling water is provided from the water pump 4 to the engine 3.

Even during idle stop control, the first idler roller 8 may be in contact with the motor/generator roller 5 and the engine roller 6, when driving of the water pump 4 is not required, or when it is inferred that the engine 3 will be restarted within a short period of time.

Configuration of the Water Circuit

Figure 8:
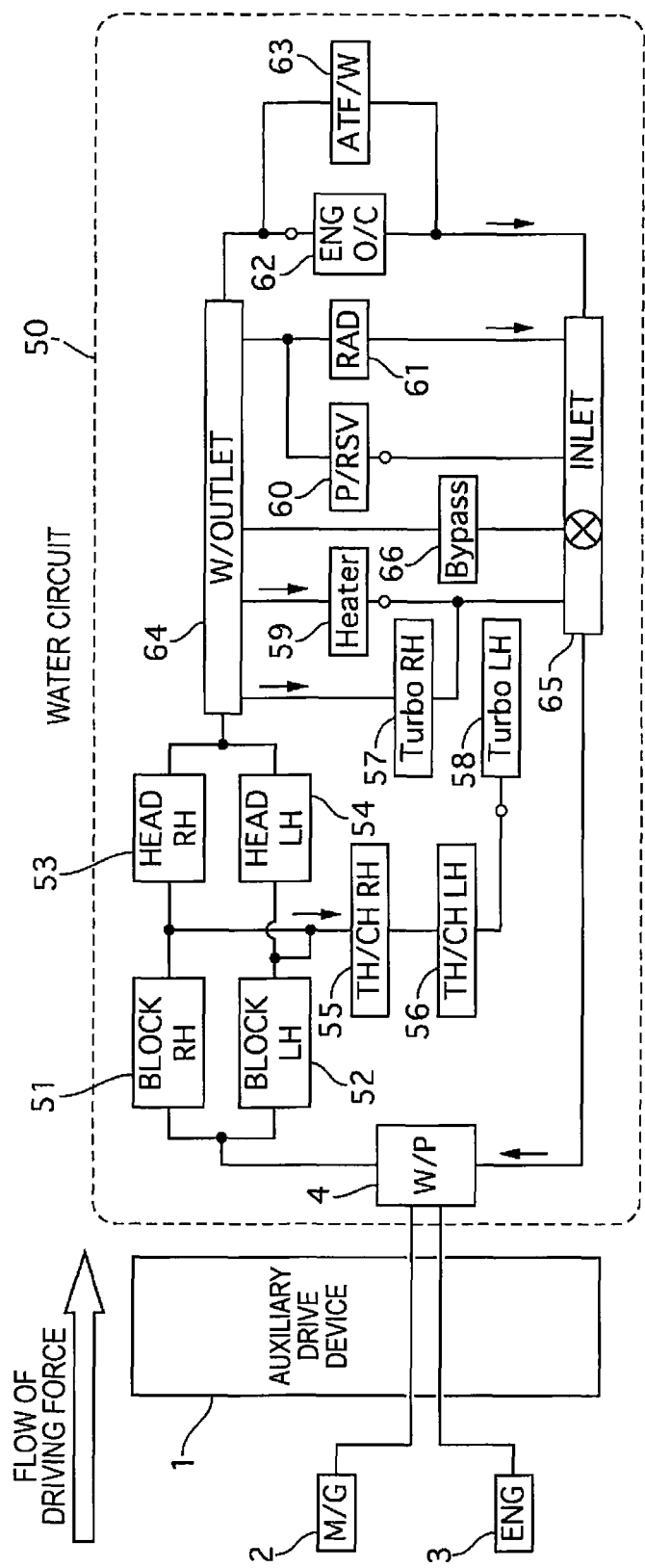
FIG. 8 is a view illustrating the water circuit of the cooling water of the first embodiment.

FIG. 8 is a view illustrating the water circuit 50 of the cooling water. The water pump 4 is driven by the engine 3 after the engine starts, and is driven by the motor/generator 2 when the engine is stopped.

The cooling water discharged from the water pump 4 is first supplied to a right cylinder block 51 and a left cylinder block 52. The cooling water that has passed through the right cylinder block 51 is sent to a right cylinder head 53 and a right throttle chamber 55. The cooling water that has passed through the left cylinder block 52 is sent to a left cylinder head 54 and the right throttle chamber 55.

The cooling water that has passed through the right throttle chamber 55 is sent to a left throttle chamber 56. The cooling water that has passed through the left throttle chamber 56 is sent to a left turbo charger 58. The cooling water that has passed through the left turbo charger is sent to a water inlet 65.

The cooling water that has passed through the right cylinder head 53 and the left cylinder head 54 is sent to a water outlet 64. The cooling water that has passed through the water inlet 65 is sent to a right turbo charger 57, a heater 59, a reservoir 60, a radiator 61, an engine oil cooler 62 and an automatic transmission fluid cooler 63.

The cooling water that has passed through the right turbo charger 57 is sent to the water inlet 65. The cooling water that has passed through the heater 59 is sent to the water inlet 65. In the heater 59, the air that is used for the heater of the air conditioner is warmed by the cooling water. The cooling water that has passed through the reservoir 60 is sent to the water inlet 65. The cooling water that has passed through the radiator 61 is sent to the water inlet 65. The cooling water that has passed through the engine oil cooler 62 is sent to the water inlet 65. The cooling water that has passed through the automatic transmission fluid cooler 63 is sent to the water inlet 65.

Part of the cooling water that has passed through the water inlet 65 is directly sent to the water outlet 64 from a bypass flow channel 66. The cooling water that has passed through the water inlet 65 is again sent to the water pump 4.

Actions

When using the heater of the air conditioner, the cooling water that has been warmed by the engine is sent to the heater, and air is warmed with the warmed cooling water. The circulation of the cooling water is carried out by the water pump that is driven by the engine.

In a vehicle comprising an idle stop function, an electric water pump is provided, apart from the water pump driven by the engine, in order to circulate the cooling water even when the engine is stopped. Switching the drive source of a single water pump between the engine and the motor/generator is conceivable for the purpose of reducing the cost of the above configuration or reducing the size of the device.

In the first embodiment, the transmission of driving force between the drive source and the auxiliary machine is carried out using a friction roller. In addition, the motor/generator 2 of the first embodiment is an auxiliary machine driven by the engine 3 as well as a drive source that drives the water pump 4. With this point in mind, in the first embodiment, the first idler roller 8 that is provided between the motor/generator roller 5 and the water pump roller 7 is configured to be switched by the actuator 30 between states of being in contact with and being separated from the motor/generator roller 5 and the engine roller 6.

When the engine 3 is driving, the actuator 30 puts the first idler roller 8 in a state of being in contact with the motor/generator roller 5 and the engine roller 6, and thereby the driving force of the engine 3 can be transmitted to the water pump 4 via the engine roller 6, the first idler roller 8, the motor/generator roller 5, the second idler roller 9, and the water pump roller 7.

On the other hand, when the engine 3 is stopped, the actuator 30 puts the first idler roller 8 in a state of being separated from the motor/generator roller 5 and the engine roller 6, and by driving the motor/generator 2, the driving force of the motor/generator 2 can be transmitted to the water pump 4 via the motor/generator roller 5, the second idler roller 9, and the water pump roller 7. At this time, the engine 3, which is a high load, can be cut off from the motor/generator 2.

In the first embodiment, the first idler roller 8 is disposed so that a wedge effect is generated when power is transmitted from the motor/generator 2 to the engine 3. When disposing the first idler roller 8 as in the first embodiment, since a wedge effect is not generated when driving force is transmitted from the engine 3 to the motor/generator 2, it is necessary to press the first idler roller 8 against the motor/generator roller 5 and the engine roller 6. However, since the load of the motor/generator 2 when the motor/generator 2 is driven by the engine 3 is smaller in comparison to the load of the engine 3 when the engine is started by the motor/generator 2, the pressing force of the first idler roller 8 can also be reduced. In other words, the load of the actuator 30 can be reduced, and the actuator 30 can be made smaller.

When using the heater of the air conditioner during idle stop, the first idler roller is separated from the motor/generator roller 5 and the engine roller 6. If the idler roller 8 were disposed so that a wedge effect is not generated when transmitting power from the motor/generator 2 to the engine 3, it would be necessary to make the idler roller 8 come in contact with, and further press against, the motor/generator roller 5 and the engine roller 6, at the time of restarting the engine 3. Consequently, the time required to restart the engine 3 may become longer.

In the first embodiment, since the idler roller 8 is disposed so that a wedge effect is generated when transmitting power from the motor/generator 2 to the engine 3, making the idler roller 8 come in contact with the motor/generator roller 5 and the engine roller 6 is sufficient at the time of restarting the engine 3, and the time required to restart the engine 3 can be reduced.

When driving the water pump 4 is not required or when it is inferred that the engine 3 will be restarted within a short period of time during idle stop, the first idler roller 8 may remain in contact with the motor/generator roller 5 and the engine roller 6. In this case, since the idler roller 8 remains in contact with the motor/generator roller 5 and the engine roller 6, the time required to restart the engine 3 can be reduced.

In the first embodiment, the motor/generator 2 is used as another drive source for driving the water pump 4, which was driven by the engine 3, during idle stop control. For this reason, there is no need to provide an electric water pump, etc., apart from the water pump 4 that is driven by the engine 3. In addition, the water pump 4 can also be driven using the motor/generator 2 that starts the engine 3 and that generates power. Thus, the heater can be used when the engine is stopped without the addition of another drive source for driving the water pump.

Effects (1) An auxiliary machine-driving device for a vehicle is provided with an engine roller 6 (first roller) that rotates integrally with the rotary shaft of an engine 3, a motor/generator roller 5 (second roller) that rotates integrally with the rotary shaft of a motor/generator 2, a water pump roller 7 (third roller) that rotates integrally with the rotary shaft of a water pump 4 (auxiliary machine), a first idler roller 8 (fourth roller) provided between the engine roller 6 and the motor/generator roller 5, a second idler roller 9 (fifth roller) that is always in contact with the motor/generator roller 5 and the water pump roller 7, and an actuator 30 for switching the first idler roller 8 between a state of contact with and a state of separation from the engine roller 6 and the motor/generator roller 5. Therefore, the drive source of the water pump 4 can be switched between the engine 3 and the motor/generator 2 by changing the position of a single idler roller (the first idler roller 8).

(2) In addition, when the first idler roller 8 is in a state of contact with the motor/generator roller 5 and the engine roller 6, the direction of rotation of the motor/generator roller 5 at the point of contact between the first idler roller 8 and the motor/generator roller 5 is the direction towards a point of intersection D between a line B, tangent at the point of contact between the first idler roller 8 and the engine roller 6, and a line C, tangent at the point of contact between the first idler roller 8 and the motor/generator roller 5. Therefore, the load of the actuator 30 can be reduced, and a smaller size can be achieved.

(3) When the engine 3 is stopped, in a state in which the first idler roller 8 is separated from the engine roller 6 and the motor/generator roller 5 by the actuator 30, the water pump 4 is driven by the motor/generator 2. Therefore, the heater can be used when the engine is stopped without the addition of another water pump or a drive source for driving the water pump.

Second Embodiment

Figure 9:
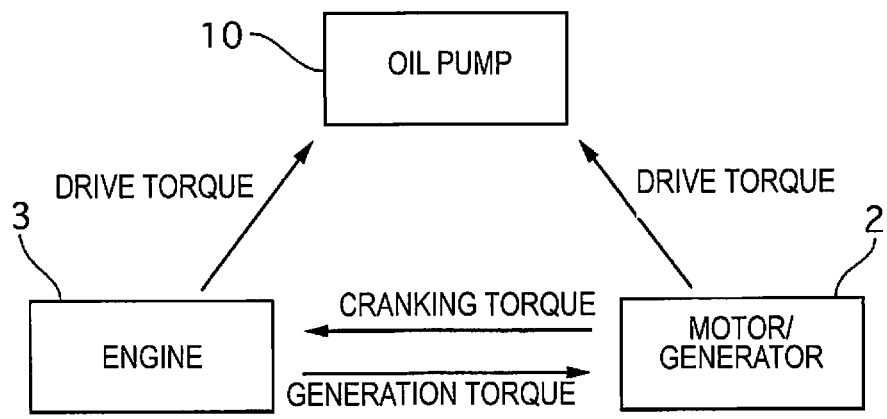
FIG. 9 is a schematic system block diagram of the auxiliary machine-driving device for vehicle of the second embodiment.
Figure 10:
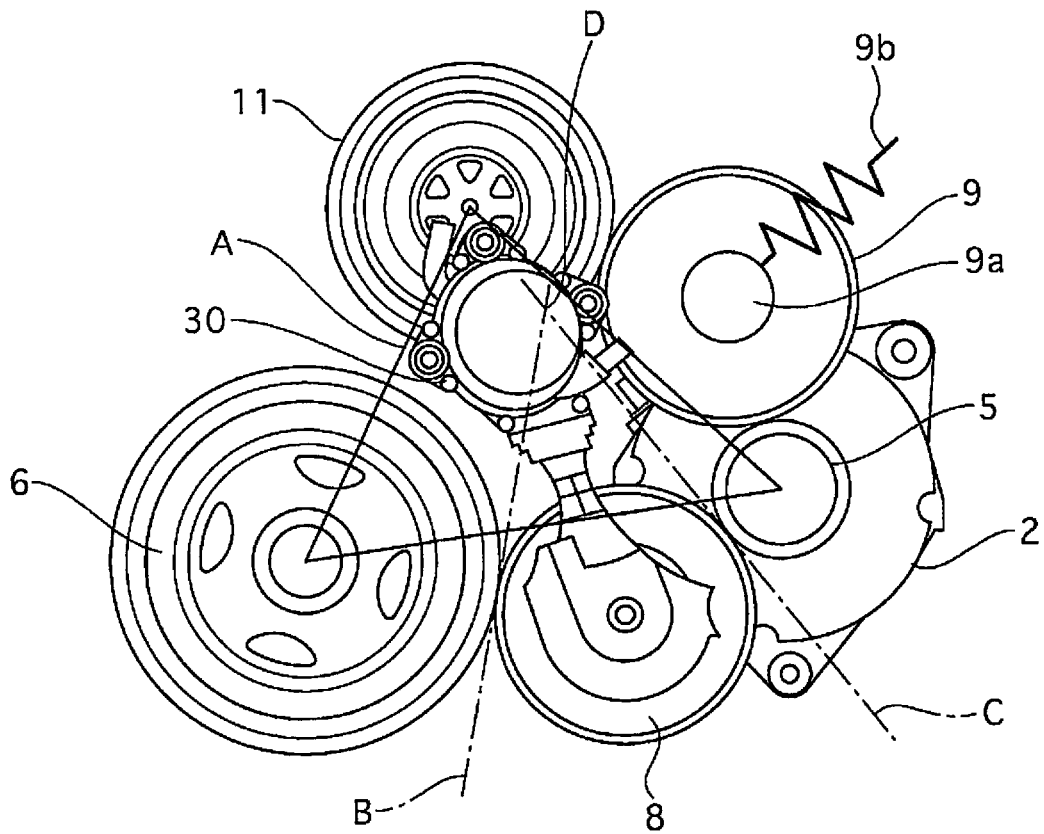
FIG. 10 is a schematic diagram illustrating the auxiliary machine-driving device for a vehicle of the second embodiment.

The auxiliary machine-driving device 1 for a vehicle of the second embodiment will now be described. FIG. 9 is a schematic system block diagram of the auxiliary machine-driving device 1 for a vehicle. FIG. 10 is a schematic diagram illustrating the auxiliary machine-driving device 1 for a vehicle.

In the first embodiment, the drive source of the water pump 4 that supplies cooling water to the engine 3 is switched between the engine 3 and the motor/generator 2, but it can be configured so that the drive source of a transmission oil pump 10 that supplies hydraulic oil to a continuously variable transmission is switched between the engine 3 and the motor/generator 2.

As shown in FIG. 10, in the second embodiment, a first oil pump roller 11 that rotates integrally with the rotary shaft of the transmission oil pump 10 is provided in the position that the water pump roller 7 is provided in the first embodiment.

Actions

During engine drive, the first idler roller 8 is pressed against the motor/generator roller 5 and the engine roller 6 by the actuator 30. Thus, the motor/generator 2 and the transmission oil pump 10 are driven by the torque of the engine 3. Hydraulic oil is supplied to the continuously variable transmission from the transmission oil pump 10. The effective pulley diameter of the continuously variable transmission is controlled by the hydraulic oil and shifting is carried out.

During idle stop control, the first idler roller 8 is separated from the motor/generator roller 5 and the engine roller 6 by the actuator 30. During idle stop control, drive torque is transmitted from the motor/generator 2 to the transmission oil pump 10. The transmission oil pump 10 is driven by the drive torque and hydraulic oil is supplied to the continuously variable transmission from the transmission oil pump 10. Thus, hydraulic oil drainage from the continuously variable transmission during idle stop control can be suppressed. Thus, the vehicle can be quickly started after the restarting of the engine 3.

Effects (4) The auxiliary machine is a continuously variable oil pump 10 (oil pump) that supplies hydraulic oil to the continuously variable transmission, and when the engine 3 is stopped, in a state in which the first idler roller 8 is separated from the engine roller 6 and the motor/generator roller 5 by the actuator 30, the transmission oil pump 10 is driven by the motor/generator 2. Therefore, the vehicle can be quickly started after an idle stop control, at the time of restarting the engine 3.

Third Embodiment

Figure 11:
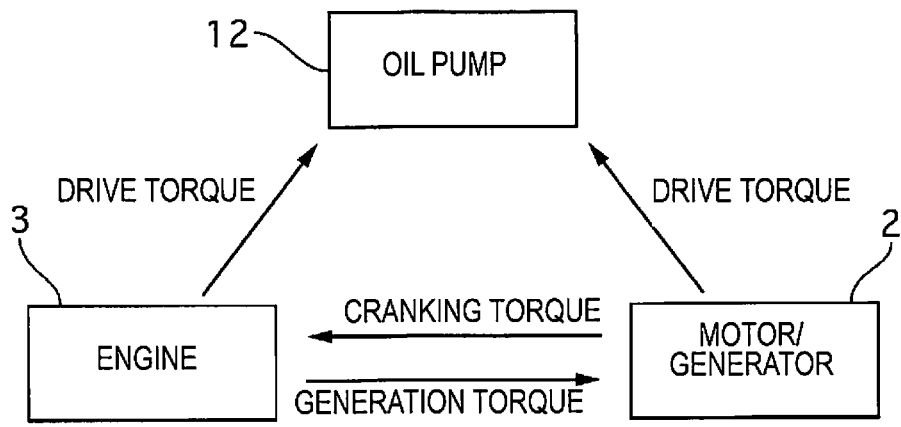
FIG. 11 is a schematic system block diagram of the auxiliary machine-driving device for a vehicle of the third embodiment.
Figure 12:
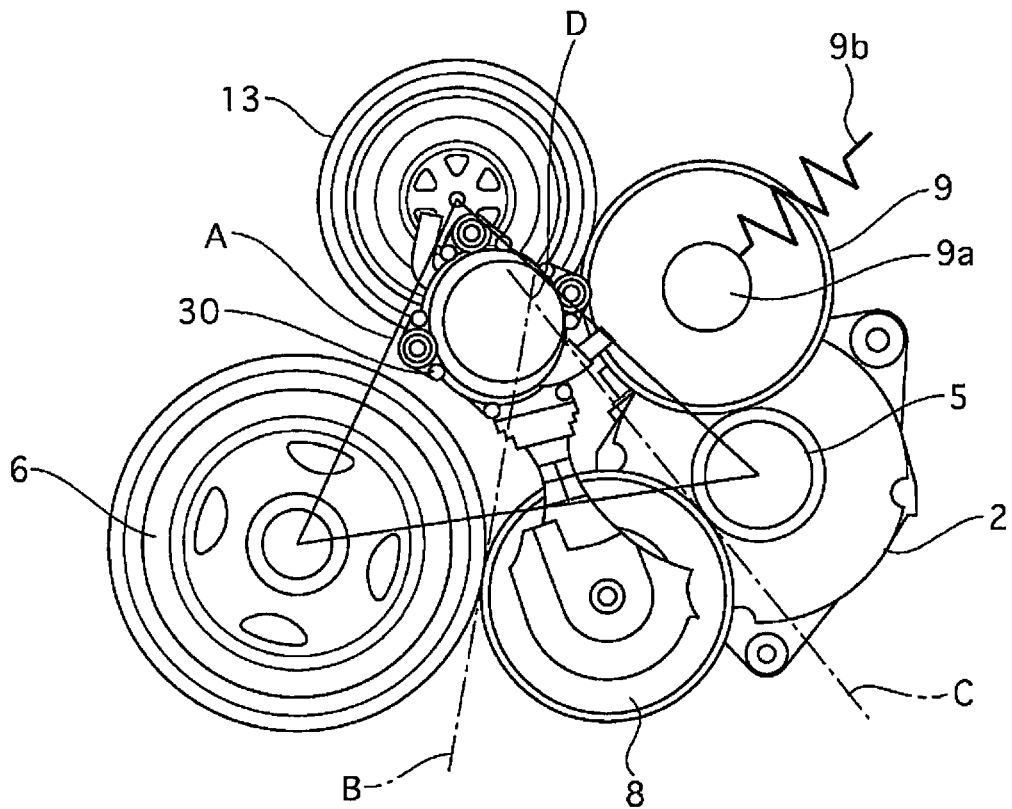
FIG. 12 is a schematic diagram illustrating the auxiliary machine-driving device for a vehicle of the third embodiment.

The auxiliary machine-driving device 1 for a vehicle of the third embodiment will now be described. FIG. 11 is a schematic system block diagram of the auxiliary machine-driving device 1 for a vehicle. FIG. 12 is a schematic diagram illustrating the auxiliary machine-driving device 1 for a vehicle.

In the first embodiment, the drive source of the water pump 4 that supplies cooling water to the engine 3 is switched between the engine 3 and the motor/generator 2, but it can be configured so that the drive source of a power steering oil pump 12 that supplies hydraulic oil to a power steering device is switched between the engine 3 and the motor/generator 2.

As shown in FIG. 12, in the third embodiment, a second oil pump roller 13 that rotates integrally with the rotary shaft of the power steering oil pump 12 is provided in the position that the water pump roller 7 is provided in the first embodiment.

Actions

During engine drive, the first idler roller 8 is pressed against the motor/generator roller 5 and the engine roller 6 by the actuator 30. Thus, the motor/generator 2 and the power steering oil pump 10 are driven by the torque of the engine 3. Hydraulic oil is supplied to the power steering device from the power steering oil pump 12. With the hydraulic oil, an assisting force for the steering force of the driver is generated.

During idle stop control, the first idler roller 8 is separated from the motor/generator roller 5 and the engine roller 6 by the actuator 30. During idle stop control, drive torque is transmitted from the motor/generator 2 to the power steering oil pump 12. The power steering oil pump 12 is driven by the drive torque and hydraulic oil is supplied to the power steering device from the power steering oil pump 12. Thus, even when the driver carries out a steering operation during an idle stop control, an assisting force for the steering force of the driver can be generated.

Effects (5) The auxiliary machine is a power steering oil pump 12 (oil pump) that supplies hydraulic oil to the power steering device, and when the engine 3 is stopped, in a state in which the first idler roller 8 is separated from the engine roller 6 and the motor/generator roller 5 by the actuator 30, the power steering oil pump 12 is driven by the motor/generator 2. Therefore, even when the driver carries out a steering operation during an idle stop control, an assisting force for the steering force of the driver can be generated.

Other Embodiments

A preferred embodiment of the present invention was described above using one embodiment based on the drawings, but specific configurations of the present invention are not limited by the embodiment, and changes to the design made without departing from the scope of the invention are also included in the present invention.

Figure 13:
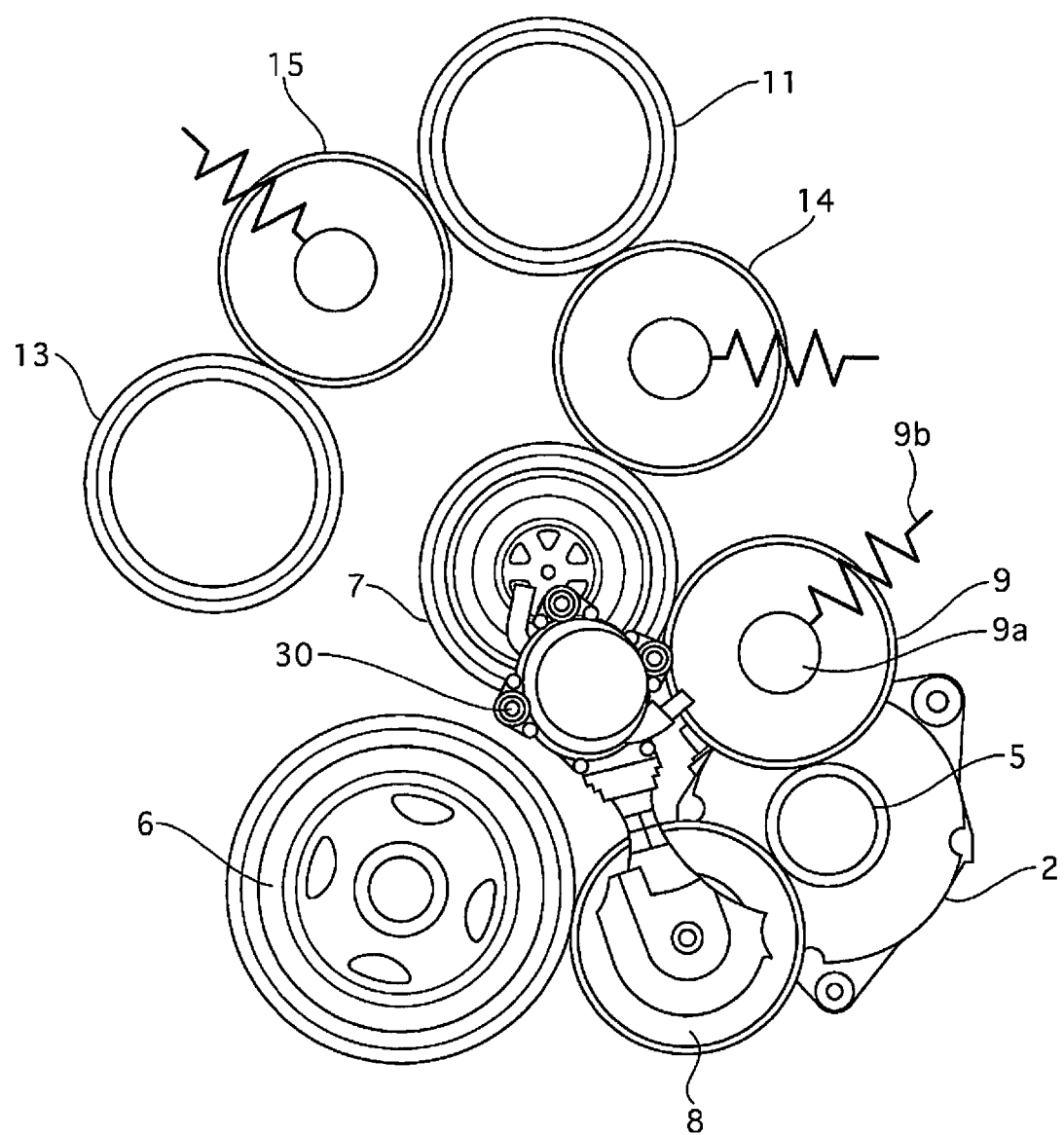
FIG. 13 is a schematic diagram illustrating an auxiliary machine-driving device for a vehicle of another embodiment.

FIG. 13 is a schematic diagram illustrating the auxiliary machine-driving device 1 for a vehicle. As shown in FIG. 13, a third idler roller 14 that comes into contact with the outer peripheral surfaces of the water pump roller 7 and the first oil pump roller 11 can be provided between the two, and a fourth idler roller 15 that comes into contact with the outer peripheral surfaces of the first oil pump roller 11 and the second oil pump roller 13 can be placed between the two.

Figure 14:
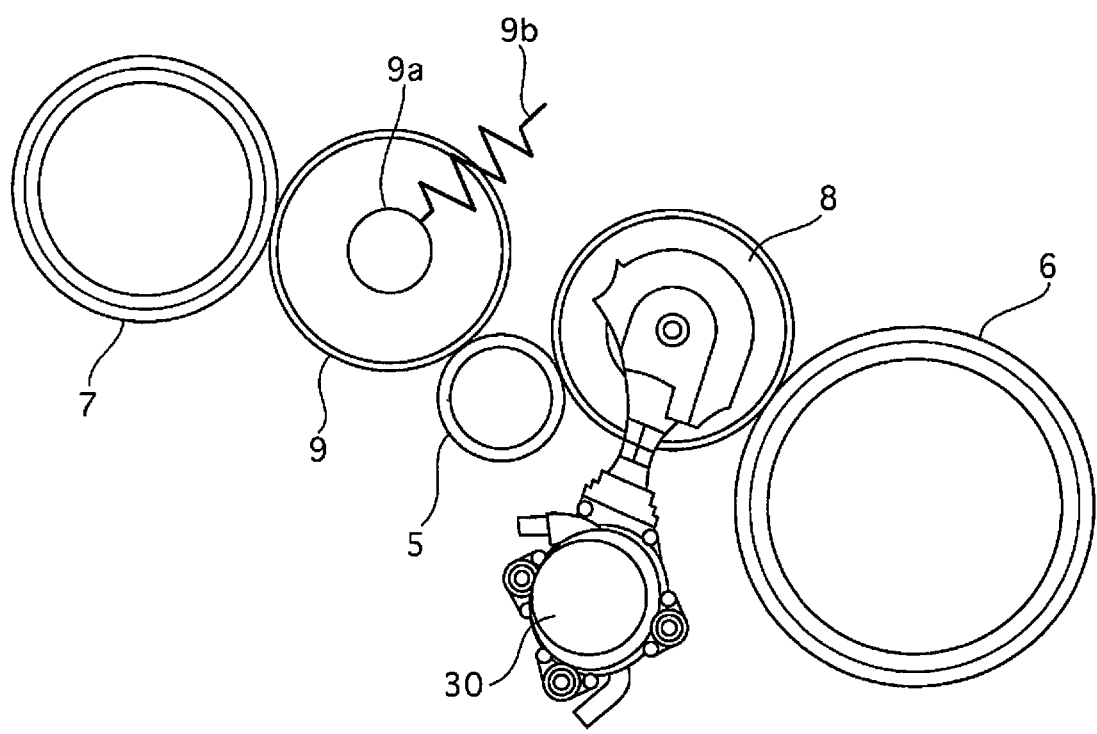
FIG. 14 is a schematic diagram illustrating an auxiliary machine-driving device for a vehicle of another embodiment.

FIG. 14 is a schematic diagram illustrating the auxiliary machine-driving device 1 for a vehicle. As shown in FIG. 14, the engine roller 6, the first idler roller 8, the water pump roller 7, the second idler roller 9, and the motor/generator roller 5 merely need be placed side by side in this order, and the arrangement is not limited to that of the first embodiment which is illustrated in FIG. 2.

The auxiliary machine, the drive source of which is switched between the engine 3 and the motor/generator 2, is not limited to the water pump 4, the transmission oil pump 10, or the power steering oil pump 12, and can be another auxiliary machine that is driven in synchronization with the engine 3.

In the first to third embodiments, the first idler roller 8 and the second idler roller 9 are provided so that the rotational centers of the first idler roller 8 and the second idler roller 9 are positioned outside of a triangle A that is formed by connecting the rotational centers of the motor/generator roller 5, the engine roller 6 and the water pump roller 7. The configuration can be such that the second idler roller 9 is provided so that the rotational center of the second idler roller 9 is positioned inside the triangle A. In this way, when power is transmitted from the motor/generator 2 to the water pump 4, the transmission oil pump 10, or the power steering oil pump 12, a wedge effect can be generated.

The invention claimed is:

1. An auxiliary machine-driving device for a vehicle, the auxiliary machine-driving device comprising:
   a first roller that rotates integrally with a rotary shaft of an engine;
   a second roller that rotates integrally with a rotary shaft of a motor/generator;
   a third roller that rotates integrally with a rotary shaft of an auxiliary machine;
   a fourth roller provided between the first roller and the second roller;
   a fifth roller that always contacts the second roller and the third roller; and
   an actuator for switching the fourth roller between a state of contact with and a state of separation from the first roller and the second roller,
   a direction of rotation of the second roller is a direction of rotation in which a wedge effect is generated on the fourth roller, and
   the actuator placing the fourth roller is in a state of contact with the first roller and the second roller upon the engine being started by a driving force of the motor/generator.

2. The auxiliary machine-driving device as recited in claim 1, wherein
   in a state in which the fourth roller contacts the first roller and the second roller, the direction of rotation of the second roller at a point of contact of the fourth roller and the second roller is in a direction towards a point of intersection of a line tangent at a point of contact between the fourth roller and the first roller and a line tangent at the point of contact between the fourth roller and the second roller.

3. The auxiliary machine-driving device as recited in claim 1, wherein
   the auxiliary machine is a water pump for supplying cooling water to the engine; and
   the water pump is driven by the motor/generator in a state in which the fourth roller is separated from the first roller and the second roller by the actuator, when the engine is stopped.

4. The auxiliary machine-driving device as recited in claim 1, wherein
   the auxiliary machine is an oil pump for supplying hydraulic oil to a continuously variable transmission, and
   the oil pump is driven by the motor/generator in a state in which the fourth roller is separated from the first roller and the second roller by the actuator, when the engine is stopped.

5. The auxiliary machine machine-driving device as recited in claim 1, wherein
   the auxiliary machine is a power steering oil pump for supplying hydraulic oil to a power steering device; and the oil pump is driven by the motor/generator in a state in which the fourth roller is separated from the first roller and the second roller by the actuator, when the engine is stopped.

6. The auxiliary machine-driving device as recited in claim 2, wherein
the auxiliary machine is a water pump for supplying cooling water to the engine; and
the water pump is driven by the motor/generator in a state in which the fourth roller is separated from the first roller and the second roller by the actuator, when the engine is stopped.

7. The auxiliary machine-driving device as recited in claim 2, wherein
the auxiliary machine is an oil pump for supplying hydraulic oil to a continuously variable transmission, and
the oil pump is driven by the motor/generator in a state in which the fourth roller is separated from the first roller and the second roller by the actuator, when the engine is stopped.

8. The auxiliary machine-driving device as recited in claim 2, wherein
the auxiliary machine is a power steering oil pump for supplying hydraulic oil to a power steering device; and
the oil pump is driven by the motor/generator in a state in which the fourth roller is separated from the first roller and the second roller by the actuator, when the engine is stopped.

* * * * *